United States Patent [19]

Kase et al.

[11] Patent Number: 4,647,623

[45] Date of Patent: Mar. 3, 1987

[54] PROCESS FOR PRODUCING POLYISOCYANATE AND RESIN COMPOSITION COMPRISING SAID POLYISOCYANATE FOR USE IN PAINTS

[75] Inventors: Mitsuo Kase; Noboru Okoshi; Kazue Tsuyuzaki, all of Chiba, Japan

[73] Assignee: Dainippon Ink and Chemicals, Inc., Tokyo, Japan

[21] Appl. No.: 776,777

[22] Filed: Sep. 17, 1985

[30] Foreign Application Priority Data

Sep. 18, 1984 [JP] Japan ................................. 59-193853
Aug. 9, 1985 [JP] Japan ................................. 60-173986

[51] Int. Cl.[4] ............................................. C08G 18/28
[52] U.S. Cl. ................................... 525/123; 525/127; 525/330.5; 528/65; 528/85; 544/193; 544/196
[58] Field of Search .................. 525/123, 127, 330.5; 528/85, 65; 544/193, 196

[56] References Cited

U.S. PATENT DOCUMENTS

| 4,040,992 | 8/1977 | Bechana et al. | 544/193 |
| 4,540,781 | 9/1985 | Bansa | 544/193 |
| 4,555,535 | 11/1985 | Bednarek et al. | 525/123 |
| 4,582,888 | 4/1986 | Kase et al. | 544/193 |

*Primary Examiner*—Maurice J. Welsh
*Attorney, Agent, or Firm*—Sherman and Shalloway

[57] ABSTRACT

A process for producing a polyisocyanate containing an isocyanurate ring which comprises reacting at least one diisocyanate compound selected from the group consisting of alkylene diisocyanates, cycloalkylene diisocyanates and aralkylene diisocyanates with a cycloalkylene diol in the presence of an isocyanurating catalyst; and a resin composition for use in non-yellowing fast-drying urethane paints, comprising (A) the aforesaid polyisocyanate and (B) an acrylic polyol having a number average molecular weight of 2,000 to 30,000 and a hydroxyl value of 20 to 200.

17 Claims, No Drawings

PROCESS FOR PRODUCING POLYISOCYANATE AND RESIN COMPOSITION COMPRISING SAID POLYISOCYANATE FOR USE IN PAINTS

This invention relates to a process for producing a polyisocyanate containing an isocyanurate ring, and to a novel and useful non-yellowing fast-drying resin composition for urethane paints. More specifically, this invention relates to a process for producing a fast-drying polyisocyanate having good compatibility with polyols, and to a resin composition comprising a combination of a specific polyisocyanate and a specific acrylic polyol which has especially superior weatherability and can be used in the field of paints for various substrates such as automobiles, buildings, electric appliances and bridges.

The resin composition obtained by the process of this invention is very useful in other industrial fields, for example in adhesives, elastomer and molding materials including laminate materials.

A number of catalysts such as tertiary amines and phosphine compounds have been known heretofore for the isocyanurating reaction of organic diisocyanates. Effective processes have already been found for the isocyanurating reaction of aromatic diisocyanates.

It has however been extremely difficult to perform effectively the isocyanurating reaction of alkylene diisocyanates, cycloalkylene diisocyanates and aralkylene diisocyanates because the selectivity of catalysts used in it is strong.

With an advance in research and development of such catalysts for isocyanurating reactions (to be referred to as isocyanurating catalysts), attempts have been made to improve these catalysts. For example, Japanese Laid-Open Patent Publications Nos. 17484/1977, 7472/1982 and 47319/1982 disclose that quaternary ammonium salts or metal carboxylate compounds can be an effective isocyanurating catalyst for diisocyanate compounds having strong selectivity for catalysts, such as alkylene diisocyanates. However, when polyisocyanates having an isocyanurate ring obtained from alkylene, cycloalkylene and/or aralkylene diisocyanates by using such a catalyst are used as a curing agent component for polyurethane resins, they have poor compatibility with polyols used as another main component, and this constitutes a very serious setback in practical application.

As one means of overcoming this setback, Japanese Laid-Open Patent Publication No. 47321/1982 proposes a method for improving the compatibility by using a polyol such as ethylene glycol, 1,3-butanediol, 1,6-hexanediol or glycerol in the isocyanurating reaction of hexamethylene diisocyanate which is one alkylene diisocyanate. This method, however, markedly reduces the inherent curing property of the polyisocyanate as a curing agent for the formation of a polyurethane resin and causes another serious trouble in practical application.

Thus, conventional polyisocyanates have various defects described above.

It is known on the other hand that a two-package non-yellowing urethane paint composed of a polyisocyanate as a curing agent and an acrylic polyol as a main component gives a coated film having excellent weatherability, durability, mechanical properties and chemical resistance and is industrially useful.

Non-yellowing urethane paints of the convention type, however, have the serious defect that when coated at ordinary temperature, the resulting coated film requires a long period of time for drying (curing), and during the drying, dust adheres to the coated film and greatly reduces its finished appearance to impair its commercial value.

Adduct-type polyisocyanates obtained by the addition reaction of polyols such as trimethylolpropane with hexamethylene diisocyanate, and biuret-type polyisocyanates obtained from water and hexamethylene diisocyanate have usually been employed as the non-yellowing curing agents. However, these curing agents require long periods of time for drying when used in combination with acrylic polyols in non-yellowing urethane paints.

As an attempt to remedy this defect, a curing agent having a high softening point derived from isophorone diisocyanate has been used to some extent. Since this type of curing agent has very low reactivity and a high softening point, it cannot induce effective curing of the coated film and the properties of the coated film are considerably deteriorated.

Attempts have also been made to add a cure promoting catalyst to the aforesaid slow-drying curing agent. Since, however, the use of such a cure promoting catalyst significantly shortens the pot life of the paint, a serious trouble is inevitably caused to the coating operation.

Attempts have also been made to some extent to improve the apparent drying property by using a large amount of a hard monomer such as styrene or methyl methacrylate and thus extremely elevating the softening point of the acrylic polyol used as a main component. This method, however, inhibits the curing of the coated film and reduces its solvent resistance and mechanical properties.

Recently, polyisocyanates having an isocyanurate ring have been developed as non-yellowing curing agents. These compounds have improved drying property over the aforesaid conventional curing agents, but because of their very inferior compatibility with acrylic polyols, they cannot be used in practical application.

The prior art relating to non-yellowing urethane paints thus has the serious defects described above in practical application.

The present inventors have made extensive investigations in view of the various defects of the prior art, and now found a process for effectively producing polyisocyanates containing an isocyanurate ring which have excellent compatibility and are industrially useful without impairing the inherent excellent curing property of isocyanurate ring-containing polyisocyanates of this type, and a very useful resin composition which can overcome the defect of requiring long drying periods in conventional non-yellowing urethane paints and the various problems of the coating operation attributed to this defect.

According to this invention, there is provided a process for producing a polyisocyanate containing an isocyanurate ring which comprises reacting at least one diisocyanate compound selected from the group consisting of alkylene diisocyanates, cycloalkylene diisocyanates and aralkylene diisocyanates with a cycloalkylene diol in the presence of an isocyanurating catalyst.

According to this invention, there is also provided a process which, by a proper selection of the diisocyanate compounds of the above group, can easily produce polyisocyanates containing an isocyanurate ring which have a variety of curing properties (drying properties), weatherabilities and mechanical properties while maintaining excellent compatibility.

The invention further provides a process for efficiently producing highly pure polyisocyanates containing an isocyanurate ring by using a compound having a low electron density and containing a highly cationic atom or atomic grouping as the isocyanurating catalyst.

The invention additionally provides a resin composition for non-yellowing fast-drying urethane paints, comprising (A) the aforesaid polyisocyanate containing an isocyanurate ring and (B) an acrylic polyol having a number average molecular weight of 2,000 to 30,000 and a hydroxyl value of 20 to 200 as essential ingredients.

Typical examples of the alkylene diisocyanates include 1,4-tetramethylene diisocyanates, 1,6-hexamethylene diisocyanate, 2,2,4- or 2,4,4-trimethylhexamethylene diisocyanate, 2,6-diisocyanate methyl caproate (lysine diisocyanate), and mixtures of these. Typical examples of the cycloalkylene diisocyanates include 1,3- or 1,4-diisocyanate cyclohexane, 1,3- or 1,4-bis(isocyanatomethyl)cyclohexane, dicyclohexylmethane-4,4'-diisocyanate, isopropylidene-bis(4-cyclohexyl isocyanate), 3-isocyanatomethyl-3,5,5-trimethylcyclohexyl isocyanate (isophorone diisocyanate), and mixtures of these. Typical examples of the aralkylene diisocyanates include xylylene diisocyanate, tetramethylxylylene diisocyanate, 4,4'-bis(isocyanatomethyl)diphenylmethane, and mixtures of these.

The cycloalkylene diol is a diol having 5 to 30 carbon atoms, preferably 6 to 20 carbon atoms. Typical examples include bis(4-hydroxycyclohexyl)methane, 2,2-bis(4-hydroxycyclohexyl)propane, 2,2-bis(4-hydroxycyclohexyl)butane and 1,4-dihydroxymethylcyclohexane.

Diols having less than 5 carbon atoms are undesirable because they reduce the characteristic compatibility of the polyisocyanate of the present invention with the polyol of a polyurethane resin and impairs the stability of such diols. On the other hand, diols having more than 30 carbon atoms are undesirable because they uselessly decrease the isocyanate group content of the polyisocyanate of this invention.

The diol used in this invention is desirably a cycloalkylene diol containing a 5- to 7-membered rigid ring and having good chemical stability because such a diol leads to the good curability (drying property) of the polyisocyanate obtained in this invention.

In practicing the process of this invention, at least one of the diisocyanates described above can be used. It should be noted however that as a means of maintaining the highest possible compatibility of the resulting isocyanurate ring-containing polyisocyanate with the acrylic polyol which has particularly poor compatibility with the above polyisocyanate among polyols, the amount of the aralkylene diisocyanate may be limited to not more than 50 mole % based on the total amount of the alkylene diisocyanate and/or the cycloalkylene diisocyanate. This quantitative limitation is also necessary where the weatherability of various products obtained by using the isocyanurate ring-containing polyisocyanate is especially important. This is because aralkylene diisocyanates generally have lower weatherability than alkylene diisocyanates and cycloalkylene diisocyanates.

The suitable amount of the diol used is generally about 0.3 to about 30 mole %, preferably 0.5 to 20 mole %, more preferably 0.5 to 15 mole %, based on the total amount of the diisocyanate compounds. The diols may be used singly or as a mixture within the quantitative range.

The present invention does not in any way limit the use of diols having more than 30 carbon atoms. The use of diols having more than 30 carbon atoms, however, is not generally preferred because it tends to reduce the content of the isocyanate groups in the final polyisocyanate containing an isocyanurate ring which is desired in this invention.

To avoid a reduction in curability (drying property), it is natural that the amount of alcohols including diols other than those specified in this invention, such as 2-ethylhexanol, 1,3-butanediol, propylene glycol or trimethylolpropane, which are used together or get mixed should be minimized.

Diols having at least 3 hydrocarbon substituents per molecule (molecular weight 100 to 1,000) such as 2,2-dimethyl-3-isopropyl-1,3-propanediol (2,2,4-trimethyl-1,3-pentanediol) are exceptions, and as is described in U.S. Ser. No. 706,593 (filed on Feb. 28, 1985, now U.S. Pat. No. 4,582,888 and European Patent Application No. 85102178.2 (filed on Feb. 27, 1985), these diols impart good compatibility and curability (drying property) and therefore can be normally used together with the diol in accordance with this invention.

The isocyanurating catalyst is a substance effective for isocyanurating and polymerizing the diisocyanate compounds, namely for obtaining polyisocyanates containing an isocyanurate ring by polymerizing the diisocyanate compounds to trimers, pentamers, heptamers, etc. It denotes compounds having a low electron density and containing a strongly cationic atom or atomic grouping such as quaternary nitrogen, sodium or potassium.

The catalyst may contain two or more strongly cationic atoms or atomic groupings. Or it may contain in the molecule an atomic grouping containing active hydrogen reactive with the isocyanate groups, such as a hydroxyl group in addition to such cationic atoms or atomic groupings.

Typical examples of the catalyst are compounds of the following general formulae [I] to [IV].

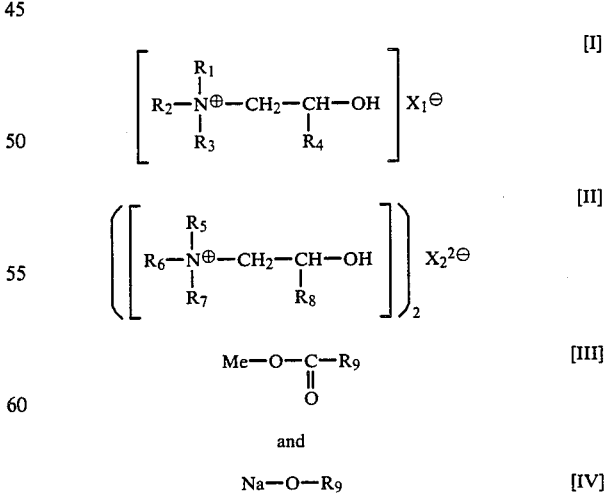

In these formulae, $R_1$, $R_2$, $R_3$, $R_5$, $R_6$ and $R_7$ are identical or different and each represents a $C_1$-$C_{20}$ hydrocarbon group or a $C_1$-$C_{20}$ hydrocarbon group containing a hetero atom such as nitrogen, oxygen or sulfur, at least two of $R_1$, $R_2$ and $R_3$ may be linked to each other, or $R_5$, $R_6$ and $R_7$ may be lined to each other through the same nitrogen substituents; $R_4$ and $R_8$ represents a hydrogen atom, a $C_1$–$C_{20}$ hydrocarbon group or a hydroxyl group-containing $C_1$–$C_{20}$ hydrocarbon group; $X_1^{\ominus}$ represents either a hydroxyl group or monocarboxylate anion or a monophenolate anion having a $C_1$–$C_{20}$ hydrocarbon chain; $X_2^{2\ominus}$ represents a dicarboxylate anion or a diphenolate anion having a $C_1$–$C_{20}$ hydrocarbon chain; $R_9$ represents a $C_1$–$C_{15}$ hydrocarbon group or a $C_1$–$C_{15}$ hydrocarbon group containing a hetero atom such as nitrogen, oxygen or sulfur; and Me represents sodium or potassium.

Typical examples of the isocyanurating catalyst represented by general formula [I] are compounds having the following structural formulae [Ia] to [Ig].

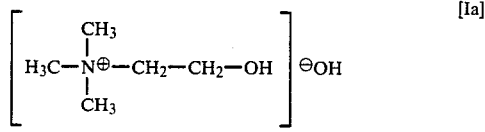  [Ia]

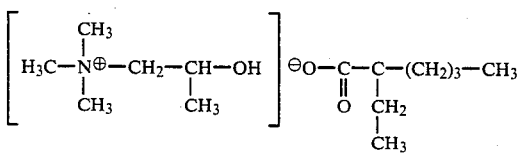  [Ib]

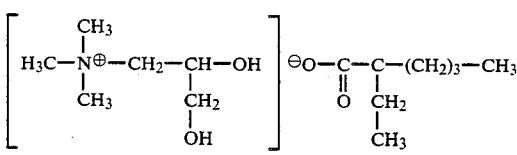  [Ic]

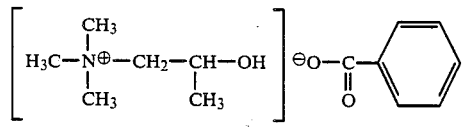  [Id]

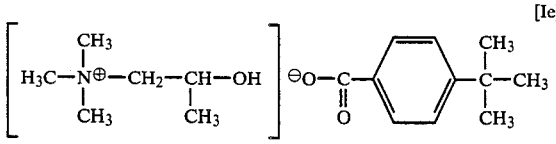  [Ie]

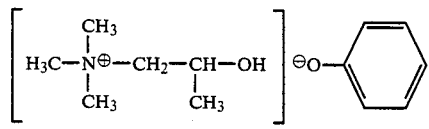  [If]

and

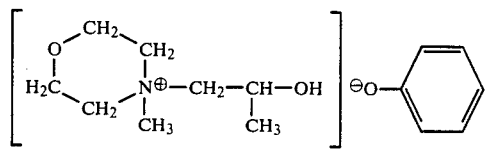  [Ig]

For most of the quarternary ammonium compounds of strucutral formulae [Ia] to [If], synthesizing methods have long been known in which these compounds are called choline or cholie derivatives. [Beilsteins Handbuch der Organishen Chemie, erster Teil (Synst. Nr. 353), 651 (1962) or T. Bonnett et al.] "The Journal of American Chemical Society", Vol. 58, No. 22 (1936). They can easily be synthesized also by the methods of I. S. Be chara described in U.S. Pat. Nos. 3,892,687, 3,993,652 and 4,040,992, and improved versions of these methods. The choline compound of the structure [Ia] is marketed and is readily available.

A typical example of the compound of general formula [II] is a compound of formula [IIa] below.

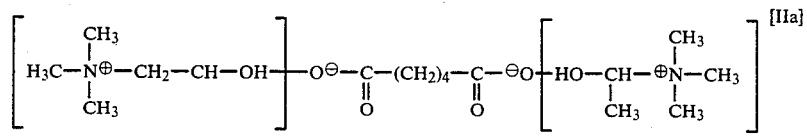  [IIa]

Such a quaternary ammonium compound can be synthesized by a modified version of method of the I. S. Bechara et al.

Sodium propionate and potassium propionate are typical examples of the compound of general formula [III].

Typical examples of the compound having the structure of general formula [IV] are sodium ethoxide, sodium n-butoxide and sodium 2-n-butoxyethoxide.

Among these isocyanurating catalysts, those represented by formulae [Id] and [Ie] are especially preferred in this invention because with these catalysts, there is no formation of by-products such as microgels during the isocyanurating reaction and the reaction can be easily carried out stably, and the resulting polyisocyanate is easy to purify.

The suitable amount of the isocyanurating catalyst is usually 0.001 to 0.2% by weight, preferably 0.002 to 0.1% by weight based on the total amount of the diisocyanate compound and the diol charged.

In performing the process of this invention, the catalyst may be used in a form diluted with an organic solvent capable of dissolving the catalyst. Typical examples of the solvent that can be used for this purpose include dimethylacetamide, N-methylpyrrolidone, butyl Cellosolve acetate and various alcohols such as ethanol, n-butanol, 2-ethylhexyl alcohol, butyl Cellosolve and benzyl alcohol. If particularly desired, various polyols such as 1,3-butanediol and 1,6-hexanediol may be used.

It is known that among the above-exemplified diluting solvents, alcohols generaly act as a co-catalyst during the isocyanurating reaction. In carrying out the process of the present invention, it is desirable to adjust the amount of the alcohols to amounts required as a diluting solvent. If the amount of the alcohol is too large, it rather impairs the curability (drying property)

of the final polyisocyanate containing an isocyanurate ring.

In carrying out the process of this invention, the isocyanurating reaction is carried out usually at a temperature in the range of about 30° to about 120° C. If the temperature exceeds 120° C., the activity of the catalyst tends to be reduced, or the final polyisocyanate is colored and its commercial value is debased.

In the isocyanurating reaction of the diisocyanate compound with the isocyanurating catalyst in this invention, urethanization reaction takes place between the diisocyanate compound and the cycloalkylene diol, and consequently, the resulting adduct exhibits a co-catalyst effect for the isocyanurating reaction.

Accordingly, in carrying out the isocyanurating reaction in the process of this invention, it is possible to simply mix the diisocyanate compound and the cycloalkylenediol in a reactor, simultaneously add the isocyanurating catalyst, and perform the reaction. Preferably, after the two reactants are uniformly mixed by, for example, heating them with stirring, the isocyanurating catalyst is added and the reaction is started. More preferably, the two reactants are completely reacted in advance and then the isocyanurating catalyst is added, followed by performing the isocyanurating reaction.

The process of this invention can be carried out batchwise or continuously. Usually, the reaction in accordance with the process of this invention is preferably terminated at a conversion properly prescribed such that the amount of the final polyisocyanate formed is within the range of 20 to 70% by weight, preferably 25 to 65% by weight, based on the total amount of the starting materials. If the conversion exceeds 70% by weight, the resulting polyisocyanate has too high a molecular weight, and cannot fully exhibit the practical performance meeting the purpose of this invention. If the conversion is increased extremely, the polyisocyanate will undesirably gel in the reactor.

After the reaction is terminated as above, the used isocyanurating catalyst can be easily deactivated by adding a deactivator, for example, acids such as dodecylbenzenesulfonic acid, monochloroacetic acid, monofluoroacetic acid or phosphoric acid, or organic acid halides such as benzoyl chloride.

From the reaction mixture which has been subjected to catalyst deactivation, various volatile substances including the unreacted diisocyanate compound can be easily removed by molecular distillation in various types of devices such as a thin film rotary evaporator or a centrifugal thin film evaporator, various extraction methods in a tower-type or rotary device, or means equivalent to these removing means.

The polyisocyanate (A) containing an isocyanurate ring obtained by the process of this invention may be liquid to solid at room temperature and usually have a molecular weight of 500 to 2000 by properly selecting the kinds and amounts of the starting materials, the reaction conversion, etc. The polyisocyanate (A) can be used in practical applications in a desired form, namely in a pure form or in a form diluted optionally with various organic solvents inert to the isocyanate groups, such as ethyl acetate, butyl acetate, ethyl Cellosolve acetate, butyl Cellosolve acetate, methyl isobutyl ketone, toluene or xylene. Preferably, a solution of the polyisocyanate (A) diluted to a concentration of 75% by weight with the organic solvent has an isocyanate content of 10 to 17%.

As stated above, according to this invention, industrially useful polyisocyanates having an isocyanurate ring which have excellent curability (drying property), weatherability and mechanical properties while retaining excellent compatibility can be produced easily by reacting the diisocyanate compound and the cycloalkylene diol in the presence of the isocyanurating catalyst.

The acrylic polyol (B) having a number average molecular weight of 2,000 to 30,000 and a hydroxyl value of 20 to 200, another essential ingredient of the composition of this invention, can be obtained, for example, by radical polymerization of an ethylenic hydrocarbon derivative of formula [V], [VI], [VII] or [VIII] below as a main material.

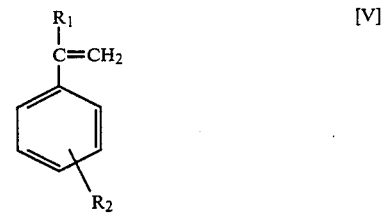

[V]

wherein each of $R_1$ and $R_2$ represents a hydrogen atom or a $C_1$-$C_{12}$ hydrocarbon group which may contain an oxygen atom.

Examples of the compounds of formula [V] are styrene, alpha-methylstyrene, p-methylstyrene, p-methoxystyrene and p-tert.-butylstyrene.

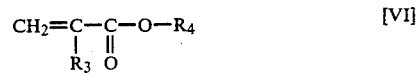

[VI]

wherein $R_3$ represents a hydrogen atom or a $C_1$-$C_{12}$ hydrocarbon group, and $R_4$ represents a $C_1$-$C_{12}$ hydrocarbon group which may contain an oxygen or nitrogen atom.

Examples of the compounds of general formula [VI] include methyl methacrylate, n-butyl methacrylate, isobutyl methacrylate, t-butyl methacrylate, 2-ethylhexyl methacrylate, ethyl acrylate, n-butyl acrylate, 2-ethylhexyl acrylate and 2-ethoxyethyl acrylate.

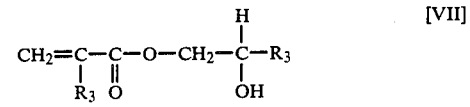

[VII]

wherein $R_3$ is as defined above.

Examples of the compounds of general formula [VII] are beta-hydroxyethyl methacrylate, beta-hydroxypropyl meth acrylate and beta-hydroxyethyl acrylate.

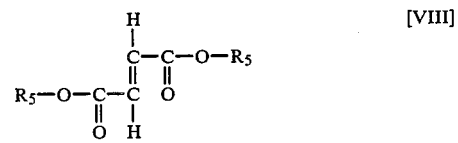

[VIII]

wherein $R_5$ represents a $C_1$-$C_{12}$ hydrocarbon group.

Examples of the compounds of general formula [VIII] are diethyl fumarate, di-n-butyl fumarate, diisobutyl fumarate and di-2-ethylhexyl fumarate.

Other examples of the ethylenic hydrocarbon derivatives which are not embraced within the general formulae [V] to [VIII] but can be used in producing the acrylic polyols include carboxy-containing ethylenic hydrocarbons such as methacrylic acid, acrylic acid and itaconic acid, and oxirane ring-containing ethylenic hydrocarbon derivatives such as glycidyl methacrylate.

The acrylic polyols may be easily prepared from the above ethylenic hydrocarbon derivatives by radical polymerization in a customary manner using a known radical initiator such as benzoyl peroxide, azobisisobutyronitrile, t-butyl peroctoate, di-t-butyl peroxide and t-butyl perbenzoate.

The radical polymerization is carried out usually at a temperature of 60° to 150° C. in an organic solvent such as toluene, xylene or butyl acetate.

The acrylic polyols (B) have a molecular weight of 2,000 to 30,000, preferably 3,000 to 20,000. If the molecular weight of the polyols is too low, a fast-drying paint is difficult to obtain. If it is too high, the resulting composition has reduced operability in coating. The acrylic polyols have a hydroxyl value of 20 to 200, preferably 30 to 120. If the hydroxyl value of the polyols is too low, it is difficult to obtain a coated film having good properties. If it is too high, the amount of the expensive polyisocyanate used becomes large and will result in such defects as economic losses.

The glass transition point (Tg) of the acrylic polyols (B) is desirably not too low in order to obtain good drying property, but is not particularly limited. Usually, it is preferably at least 25° C., especially preferably at least 30° C. If the Tg is too high, the coated film tends to lose flexibility. Generally, the Tg of the acrylic polyols is desirably not more than 80° C., more preferably not more than 70° C.

When particularly desired, the acrylic polyols may be those modified with polyesters including alkyd resins or cellulose. The amount of the polyesters or cellulose used as a modifier is desirably not more than 50% by weight, preferably not more than 30% by weight, in order not to impair the inherent excellent weatherability of the acrylic polyols.

When the resin composition of this invention comprising the isocyanurate ring-containing polyisocyanate and the acrylic polyols as essential ingredients is to be used as a paint, it is proper to blend the two components in such a way that the isocyanate groups and the hydroxyl groups exist in equal equivalent weights, namely the equivalent ratio of NCO/OH is 1.0. When a paint having especially good properties is desired, the two components are blended in such proportions that the NCO/OH equivalent ratio becomes from 0.3 to 2.0, preferably from 0.8 to 1.2.

The resin composition of this invention for urethane paints can be used directly as a clear varnish, or as an enamel paint after incorporating various pigments such as titanium white, carbon black and cyanine blue or body pigments (extender pigments).

The composition of this invention in the form of such a clear varnish or an enamel is a two-package paint composed of the acrylic polyol (B) as a main component and the isocyanurate ring-containing polyisocyanate (A) as a curing agent. The pigment in the enamel is usually incorporated in the main component. Ordinary thinners used for urethane paints may be used as diluting solvents.

When the composition of this invention is to be used as a paint, known conventional additives, for example celluloses such as cellulose acetate butyrate or nitrocellulose, plasticizers, levelling agents or surface-active agents may be used together. If particularly desired, a curing catalyst may also be used together.

The two-package paint is used by mixing the curing agent and the main component immediately before application. The mixture is coated on a substrate in a customary manner by air spraying, airless spraying, electrostatic coating, roll coating, etc. to give a coated film having good drying property and good film properties. If particularly desired, the coating may be forcibly dried at a temperature of 40° to 100° C. to obtain a cured film within a very short period of time. This procedure can also give a coated film of good quality.

The polyisocyanates containing an isocyanurate ring obtained by the process of this invention are of extreme industrial importance, and when combined with various polyols for urethane such as polyester polyols including alkyd resins, polyether polyols or acrylic polyols and substances having reactivity with the isocyanate groups, such as hydroxyl-containing substances (e.g. epoxy resins), can find practical applications not only in the paints described above, but also various industrial materials such as foams, adhesives, elastomers, molding materials for RIM (reaction injection molding), and composite materials including ACM (advanced composite material).

The following Examples and Comparative Examples illustrate the present invention more specifically. Unless otherwise specified, all percentages in the following examples are by weight.

EXAMPLE 1

A 2-liter glass four-necked flask equipped with a stirrer, a nitrogen gas introducing tube, an air cooling tube and a thermometer was charged in an atmosphere of nitrogen gas with 1400 g (8.32 moles) of hexamethylene diisocyanate (HMDI; molecular weight=168.2) and 50 g (0.21 mole) of bis(4-hydroxycyclohexyl)propane (HCP; molecular weight=240.4). These materials were heated to 80° C. and maintained for 2 hours at this temperature to form a uniform solution. The temperature of the solution was then lowered to 55° C.

A 20% butyl Cellosolve solution of N,N,N-trimethyl-N-2-hydroxypropyl ammonium tert.-butyl benzoate (having the structural formula [Ie]; to be abbreviated as CPB; molecular weight 295.4) as an isocyanurating catalyst was added portionwise to the flask. When 1.7 g (1.15 millimoles) in total of the catalyst solution was added, the reaction started and exotherm was observed. The temperature in the reactor rose to 59° C. After the exotherm ceased, the reaction was carried out for 5 hours in total while maintaining the temperature of the inside of the reactor at 60° C. As a catalyst deactivator, 1.7 g (1.23 millimoles) of a 6.8% xylene solution of monochloroacetic acid (molecular weight 94.5) was added to the reactor to terminate the reaction. The reaction mixture was cooled to room temperature. One thousand grams of the reaction mixture was subjected to molecular distillation to give 351.5 g of the desired polyisocyanate (conversion=35.2%) and 647.0 g (conversion=64.8%) of a distillate.

The resulting polyisocyanate was a liquid substance having flowability at room temperature. The polyisocyanate solution obtained by diluting it to 75% with ethyl acetate had a nonvolatile content (NV) of 75.1%, a Gardner color number (to be simply referred to as a color number hereinafter) of less than 1 and a Gardner viscosity (to be simply referred to as a viscosity hereinafter) of A-B. The polyisocyanate had an isocyanate content of 14.8%.

Analysis showed that the polyisocyanate contained an isocyanurate ring. The molecular weight of the polyisocyanate measured was 672.

The distillate obtained by molecular distillation was determined to be substantially pure HMDI.

COMPARATIVE EXAMPLE 1

Example 1 was repeated except that HCP was not used. A polyisocyanate for comparison was obtained at a conversion of 34.0%.

A diluted ethyl acetate solution of the resulting polyisocyanate had an NV of 75.0%, a color number of less than 1, a viscosity of $A_2$-$A_1$. The polyisocyanate had an isocyanate content of 16.5% and a molecular weight of 608.

COMPARATIVE EXAMPLE 2

Example 1 was repeated except that 50 g (0.55 mole) of 1,3-butanediol (molecular weight 90.1) was used instead of HCP. A polyisocyanate for comparison was obtained at a conversion of 36.5%.

A diluted ethyl acetate solution of the resulting polyisocyanate had an NV of 75.1%, a color number of less than 1 and a viscosity of $A_2$-$A_1$. The polyisocyanate had an isocyanate content of 14.9% and a molecular weight of 622.

The distillate obtained by molecular distillation was determined to be substantially pure HMDI.

PERFORMANCE TEST EXAMPLE 1 AND COMPARATIVE PERFORMANCE TEST EXAMPLES 1-2

The compatibilities of the polyisocyanates obtained in Example 1 and Comparative Examples 1 and 2 with polyols were examined by using "Beckosol 1308E" (an alkyd polyol manufactured by Dainippon Ink and Chemicals, Inc.) and "Acrydic A-801" (an acrylic polyol manufactured by the same company). The drying properties (curabilities) of these polyisocyanates were also examined using "Acrylic 54-630" having especially good compatiblity.

The properties of the polyols mentioned above are shown in Table 1.

TABLE 1

| Polyol | NV (%) | Solvent | Viscosity | Acid number | Color number | OH value |
|---|---|---|---|---|---|---|
| Beckosol 1308E | 50 | Ethyl acetate | A-D | <13 | <7 | — |
| Acrydic A-801 | 50 ± 1 | Toluene, butyl acetate | R-T | <3 | <1 | 50 ± 2 |
| Acrydic 54-630 | 60 ± 1 | Toluene, xylene, butyl acetate | W-Z | 6-8 | <2 | 55 ± 3 |

TABLE 2

| | Performance Test Example | Comparative Performance Test Example | |
|---|---|---|---|
| | 1 | 1 | 2 |
| Formulation (g) | | | |
| HMDI | 1400 | 1400 | 1400 |
| HCP | 50 | 0 | 0 |
| 1,3-BD | 0 | 0 | 50 |
| Proportions of the starting materials for the polyisocyanate (%) (*1) | | | |
| HMDI | 90 | 100 | 91 |
| HCP | 10 | 0 | 0 |
| 1,3-BD | 0 | 0 | 9 |
| Properties of the polyisocyanate | | | |
| NV (%) | 75.1 | 75.0 | 75.1 |
| Viscosity | A-B | $A_2$-$A_1$ | $A_2$-$A_1$ |
| NCO (%) | 14.8 | 16.5 | 14.9 |
| Molecular weight | 672 | 608 | 622 |
| Compatibility of the polyisocyanate (*2) | | | |
| Beckosol 1308E; solution | Transparent | Transparent | Transparent |
| film | " | Transparent | Transparent |
| Acrydic A-801; solution | " | Transparent | Transparent |
| film | " | Hazy | Transparent |
| Drying property (curability) of the polyiscyanate (*3) [copper dust free time in minute] | 115 | 115 | 160 |

Note to Table 2
(*1): Proportions of the starting materials for the polyisocyanate calculated from the conversion and the results of analysis in each of Examples and Comparative Examples.
(*2): The test was carried out by using the polyisocyanate and the polyol in a weight ratio of 3:7. The compatibility of the film was visually evaluated after coating the solution on a glass plate and allowing it to stand for one day.
(*3): The polyisocyanate and the "Acrydic 54-630" were blended in such proportions that the isocyanate groups were of equal equivalent weight to the hydroxyl groups. The non-volatile content of the mixture was adjusted to 55% by a thinner. The mixture was then coated on a tin plate at 20° C. to a film thickness of 50 micrometers. The time which elapsed until a copper powder no longer adhered to the film was determined, and defined as the drying property.

The results shown in Table 2 show that the polyisocyanates obtained by the process of this invention have further improved compatibility without significantly impairing their inherent drying property.

EXAMPLE 2

Example 1 was repeated except that 7.21 moles of 1,3-bis(isocyanatomethyl)-cyclohexane ($H_6XDI$; molecular weight=194.2) was used instead of HMDI, the amount of the 20% butyl Cellosolve solution of CPB was changed to 2.9 g (1.96 millimoles), and the reaction temperature in the isocyanuration was adjusted to 70° C. One thousand grams of the reaction mixture was subjected to moleculr distillation to give 409.4 g (conversion=41.0%) of polyisocyanate and 589.1 g (recovery ratio=59.1%) of a distillate.

The resulting polyisocyanate was jelly-like at room temperature. It was diluted to an NV of 75% with ethyl acetate to give 545.9 g of an ethyl acetate solution of the polyisocyanate.

This solution had an NV of 74.9%, a color number of less than 1 and a viscosity of I-J. Analysis led to the determination that the polyisocyanate contained an isocyanurate ring. The molecular weight of the polyisocyanate measured was 618 and its isocyanate content was 14.0%.

Analysis of the distillate obtained by molecular distillation showed that this distillate is substantially pure $H_6XDI$.

COMPARATIVE EXAMPLE 3

Example 2 was repeated except that HCP was not used, and the amount of the 20% solution of CPB was changed to 3.0 g (2.03 millimoles). The reaction conversion after molecular distillation was 36.3%. An ethyl acetate solution of the resulting polyisocyanate had an NV of 75.1%, a color number of less than 1, a viscosity of I-J and an isocyanate content of 14.8%. The molecular weight of the polyisocyanate was 603.

PERFORMANCE TEST EXAMPLE 2 AND COMPARATIVE PERFORMANCE TEST EXAMPLE 3

The compatibilities and drying properties (curabilities) of the polyisocyanates obtained in Example 2 and Comparative Example 3 were examined in the same way as in Performance Test Example 1 and Comparative Performance Test Examples 1 and 2. The results are shown in Table 3.

TABLE 3

|  | Performance Test Example 2 | Comparative Performance Test Example 3 |
|---|---|---|
| Formulation (g) |  |  |
| $H_6XDI$ | 1400 | 1400 |
| HCP | 50 | 0 |
| Proportions of the starting materials for the polyisocyanate (%) |  |  |
| $H_6XDI$ | 92 | 100 |
| HCP | 8 | 0 |
| Properties of the polyisocyanate |  |  |
| NV (%) | 74.9 | 75.1 |
| Viscosity | I-J | I-J |
| NCO (%) | 14.0 | 14.8 |
| Molecular weight | 618 | 603 |
| Compatibility of the polyisocyanate |  |  |
| Beckosol 1308E; solution | Transparent | Transparent |
| film | " | " |
| Acrydic A-801; solution | " | " |
| film | " | Hazy |
| Drying property (curability) of the polyisocyanate [copper dust free time in minute] | 23 | 22 |

EXAMPLE 3

The same reaction as in Example 1 was carried out except that 980 g (5.83 moles) of HMDI, 420 g (2.17 moles) of H6XDI and 50 g (0.21 mole) of HCP were used as the starting materials and the amount of the 20% butyl Cellosolve solution of CPB was changed to 2.5 g (1.69 millimoles). The reaction mixture obtained by deactivating the catalyst was cooled to room temperature, and then 100 g of it was subjected to molecular distillation to give 461.3 g (conversion=46.2%) of polyisocyanate and 537.2 g (recovery ratio=53.8%) of a distillate.

The polyisocyanate was diluted to an NV of 75% with ethyl acetate to prepare an ethyl acetate solution of the polyisocyanate. The solution had an NV of 75.0%, a color number of less than 1, and a viscosity of B-C. The polyisocyanate had an isocyanate content of 14.4% and a molecular weight of 675. It was determined that this polyisocyanate contained an isocyanurate ring.

Analysis of the distillate obtained by molecular distillation led to the determination that it was approximately a mixture of HMDI and $H_6XDI$ in a weight ratio of 7:3.

COMPARATIVE EXAMPLE 4

Example 1 was repeated except that HPC was not used, the amount of HMDI was changed to 980 g (5.83 moles) and the amount of $H_6XDI$ was changed to 420 g (2.17 moles). The reaction conversion was 42.6%.

An ethyl acetate solution of the polyisocyanate had an NV of 74.9%, a color number of less than 1 and a viscosity of B-C. The polyisocyanate had an isocyanate content of 15.5% and a molecular weight of 630.

Analysis of the distillate obtained by molecular distillation led to the determination that the distillate was approximately a mixture of HMDI and $H_6XDI$ in a weight ratio of 7:3.

PERFORMANCE TEST EXAMPLE 3 AND COMPARATIVE PERFORMANCE TEST EXAMPLE 42

The compatibilities and drying properties (curabilities) of the polyisocyanates obtained in Example 3 and Comparative Example 4 were examined in the same way as in Performance Test Example 1 and Comparative Performance Test Example 1. The results are summarized in Table 4.

TABLE 4

|  | Performance Test Example 3 | Comparative Performance Test Example 4 |
|---|---|---|
| Formulation (g) |  |  |
| HMDI | 980 | 980 |
| $H_6XDI$ | 420 | 420 |
| HCP | 50 | 0 |
| Proportions of the starting materials for the polyisocyanate (%) |  |  |
| HMDI | 65 | 70 |
| $H_6XDI$ | 28 | 30 |
| HCP | 7 | 0 |
| Properties of the polyisocyanate |  |  |
| NV (%) | 75.0 | 74.9 |
| Viscosity | B-C | B-C |
| NCO (%) | 14.4 | 15.5 |
| Molecular weight | 675 | 630 |
| Compatibility of the polyisocyanate |  |  |
| Beckosol 1308E; solution | Transparent | Transparent |
| film | " | " |
| Acrydic A-801; solution | " | " |
| film | " | Hazy |
| Drying property (curability) of the polyisocyanate [copper dust free time in minute] | 65 | 65 |

EXAMPLE 4

Example 1 was repeated except that the starting materials were changed to 1316 g (7.82 moles) of HMDI, 84 g (0.45 mole) of xylylene diisocyanate (XDI; molecular weight=188.2), 50 g (0.21 mole) of HCP and 2.6 g (1.76 millimoles) of a 20% butyl Cellosolve solution of CPB. One thousand grams of the resulting reaction mixture was subjected to molecular distillation to give 304.5 g (conversion=30.5%) and 994.0 g (recovery ratio=69.5%) of a distillate.

The resulting polyisocyanate was diluted with ethyl acetate to an NV of 75%. The resulting solution had an NV of 75.0%, a color number of less than 1 and a viscosity of B-C. The polyisocyanate had an isocyanate content of 14.1% and a molecular weight of 710. It was determined that the polyisocyanate contained an isocyanurate ring.

Analysis of the distillate obtained by molecular distillation led to the determination that it was substantially pure HMDI.

COMPARATIVE EXAMPLE 5

Example 1 was repeated except that HCP was not used, the amount of HMDI was changed to 1316 g (7.82 moles) and the amount of XDI was changed to 84 g (0.45 mole). The reaction conversion after molecular distillation was 33.0%. The resulting polyisocyanate was diluted with ethyl acetate. The resulting solution had an NV of 75.2%, a color number of less than 1 and a viscosity of B-C. The polyisocyanate had an isocyanate content of 15.2% and a molecular weight of 705.

Analysis of the distillate obtained by molecular distillation led to the determination that it was substantially pure HMDI.

PERFORMANCE TEST EXAMPLE 4 AND COMPARATIVE PERFORMANCE TEST EXAMPLE 5

The compatibilities and drying properties (curabilities) of the polyisocyanates obtained in Example 4 and Comparative Example 5 were examined in the same way as in Performance Test Example 1 and Comparative Performance Test Examples 1 and 2. The results are summarized in Table 5.

TABLE 5

|  | Performance Test Example 4 | Comparative Performance Test Example 5 |
|---|---|---|
| Formulation (g) | | |
| HMDI | 1316 | 1316 |
| XDI | 84 | 84 |
| HCP | 50 | 0 |
| Proportions of the starting materials for the polyisocyanate (%) | 70 | 82 |
| HMDI | 70 | 82 |
| XDI | 19 | 18 |
| HCP | 11 | 0 |
| Properties of the polyisocyanate | | |
| NV (%) | 75.0 | 75.2 |
| Viscosity | B-C | B-C |
| NCO (%) | 14.1 | 15.2 |
| Molecular weight | 710 | 705 |
| Compatibility of the polyisocyanate | | |
| Beckosol 1308E; solution film | Transparent " | Transparent " |
| Acrydic A-801; solution film | Transparent " | Transparent hazy |
| Drying property (curability) of the polyisocyanate [copper dust free time in minute] | 65 | 65 |

The advantage of this invention, as shown in the foregoing examples, is that polyisocyanates having both excellent compatibility and curability (drying property) not seen in conventional polyisocyanates can be produced easily.

The properties of the polyisocyanate in Example 1 are shown in Table 2. In the Table, the Acrydic A-801 is most generally used among acrylic polyols. But the polyisocyanate of Comparative Example 1 had poor compatibility with Acrydic A-801, and it was difficult to examine its drying property (time) accurately. Hence, there was no option but to compare its drying property by using Acrydic 54-630 which has a low molecular weight and a slow drying time but has good compatibility.

Generally, it is difficult to improve the compatibility of ordinary diols such as ethylene glycol or propylene glycol with acrylic polyols. 1,3-Butanediol used in Comparative Example 2, however, has an action of improving compatibility as an exception, but has the defect of markedly reducing drying property.

The compatibility is improved also when the isocyanuration is carried out in the presence of a monoalcohol such as n-butyl alcohol, 2-ethylhexanol or butyl Cellosolve, but the presence of such a monoalcohol markedly reduces drying property. For example, when the diol used in Example 1 is replaced by the monoalcohol, the drying property (time) is lowered approximately to 200 to 220 minutes.

EXAMPLE 5

A two-package urethane paint was prepared by using a 75% ethyl acetate solution of the polyisocyanate obtained in Example 1 (to be abbreviated as sample No. P1) and "Acrydic A-800" (acrylic polyol manufactured by Dainippon Ink and Chemicals, Inc.; molecular weight=16,000; OH value=50), and the properties of a coated film prepared from it were examined. The results are shown in Table 7.

It is seen that this paint had better drying property and film properties than the comparative paints shown in this table.

EXAMPLE 6

A two-package urethane paint was prepared by using a 75% ethyl acetate solution of the polyisocyanate obtained in Example 2 (to be abbreviated as sample No. P2) and "Acrydic A-800", and the properties of a coated film prepared from it were examined. The results are shown in Table 7. It is seen from Table 7 that this paint had excellent drying property.

EXAMPLE 7

A two-package urethane paint was prepared by using a 75% ethyl acetate solution of the polyisocyanate obtained in Example 3 (to be abbreviated as sample No. P3) and "Acrydic A-800", and the properties of a coated film prepared from it were examined. The results are shown in Table 7. It is seen from Table 7 that this paint had excellent drying property and gave a coated film having well-balanced mechanical properties.

EXAMPLE 8

A two-package urethane paint was prepared by using a 75% ethyl acetate solution of the polyisocyanate obtained in Example 4 (to be abbreviated as sample No. P4) and "Acrydic A-800", and the properties of a coated film prepared from it were examined. The results are shown in Table 7. It is seen from Table 7 that this paint had excellent drying property and gave a coated film having well-balanced mechanical properties.

EXAMPLE 9

Example 3 was repeated except that 50 g (0.35 mole) of 1,4-hydroxymethylcyclohexane (HMC; molecular weight=144.2) was used instead of HCP. The reaction mixture obtained by deactivating the catalyst was cooled to room temperature, and 1000 g of it was subjected to molecular distillation to give 456.0 g (conversion=45.7%) of polyisocyanate and 541.9 9 (recovery ratio=54.3%) of a distillate.

The resulting polyisocyanate was diluted to an NV of 75% with ethyl acetate to prepare a polyisocyanate solution (P5).

The solution P5 had an NV of 75.2%, a color number of less than 1 and a viscosity of B-C. The polyisocyanate had an isocyanate content of 13.9% and a molecular weight of 644. It was determined that this polyisocyanate contained an isocyanurate ring.

Analysis of the distillate obtained by molecular distillation led to the determination that it was approximately a mixture of HMDI and $H_6$XDI in a weight ratio of 7:3.

A two-package urethane paint was prepared by using the resulting polyisocyanate solution P5 and "Acrydic A-800", and the properties of a coated film prepared from it were examined. The results are shown in Table 7. It is seen from Table 7 that this paint had excellent drying property, and gave a coated film having well balanced mechanical properties.

COMPARATIVE EXAMPLE 6

A 75% ethyl acetate solution of the comparative polyisocyanate obtained in Comparative Example 1 (to be abbreviated as sample No. T1) had poor compatibility with "Acrydic A-800" which is an acrylic polyol, and a test for the properties of a coated film could not be conducted (see TAble 7).

COMPARATIVE EXAMPLES 7-9

A two-package urethane paint was prepared by using a 75% ethyl acetate solution of the comparative polyisocyanate obtained in Comparative Example 2 (to be abbreviated as sample No. T2), "Burnock DN-950" (an adduct-type non-yellowing polyisocyanate manufactured by Dainippon Ink and Chemicals, Inc.) or a commercial biuret-type curing agent, and "Acrydic A-800", and the properties of a coated film prepared from it were examined. The results are shown in Table 7. It is seen from Table 7 that these paints required a long drying period.

The proportions of the starting materials charged, compositions and properties of the polyisocyanates used in Examples 5 to 9 and Comparative Examples 6 and 7 are summarized in Table 6.

TABLE 6

| | Example | | | | | Comparative Example | |
|---|---|---|---|---|---|---|---|
| | 5 | 6 | 7 | 8 | 9 | 6 | 7 |
| Proportions of the starting materials charged (g) | | | | | | | |
| HMDI | 1400 | | 980 | 1316 | 980 | 1400 | 1400 |
| $H_6$XDI | | 1400 | 420 | | 420 | | |
| XDI | | | | 84 | | | |
| HCP | 50 | 50 | 50 | 50 | | | |
| HMC | | | | | 50 | | |
| 1,3-BG | | | | | | | 50 |

TABLE 6-continued

| | Example | | | | | Comparative Example | |
|---|---|---|---|---|---|---|---|
| | 5 | 6 | 7 | 8 | 9 | 6 | 7 |
| Designation of the polyisocyanate | P1 | P2 | P3 | P4 | P5 | T1 | T2 |
| Properties | | | | | | | |
| NV | 75.1 | 74.9 | 75.0 | 75.0 | 75.2 | 75.0 | 75.1 |
| Viscosity | A-B | I-J | B-C | B-C | B-C | $A_2$-$A_1$ | $A_2$-$A_1$ |
| NCO (%) | 14.8 | 14.0 | 14.4 | 14.1 | 13.9 | 16.5 | 14.9 |
| Molecular weight | 672 | 618 | 675 | 710 | 644 | 608 | 622 |
| Analyzed composition (%) (*) | | | | | | | |
| HMDI | 90 | | 65 | 70 | 65 | 100 | 91 |
| $H_6$XDI | | 92 | 28 | | 28 | | |
| XDI | | | | 19 | | | |
| HCP | 10 | 8 | 7 | 11 | | | |
| HMC | | | | | 8 | | |
| 1,3-BG | | | | | | | 9 |

(*): Estimated values based on the results of analysis.

The drying properties and film properties of the paints obtained in Examples 5 to 9 and Comparative Examples 6 and 7 are summarized in Table 7.

The various properties shown in the table were measured and determined as follows:

A. Formulation, Coating and Drying

Main component: "Acrydic A-800" (NV 50±1%; Gardner viscosity at 25° C. R to T; acid value <3; hydroxyl value 50±2; measured molecular weight 16,000)

Pigment: "Tipaque CR-90" (rutile-type titanium dioxide manufactured by Ishihara Sangyo Co., Ltd.; PWC 35%)

Thinner: Solvesso 100/xylene/toluene/butyl acetate/ethyl acetate/Cellosolve acetate=10/40/20/10/10/10 (weight ratio)

Coating: Air sprayer, bar coater

Drying: Ordinary temperature drying at 20° C.; forced drying 80° C. for 30 minutes Film thickness: 35 to 45 micrometers

B. Testing of the Coated Film

Drying property (copper dust free time): Evaluated by the state of adhesion of a copper powder with the passage of time.

Gloss: 60-degree specular reflectance (%)

Hardness: The hardness of the coated film until "injury" occurs in it, as evaluated by Mitsubishi Uni Hardness.

Adhesion: A crosscut is formed on the coated film. A cellophane tape is applied to the surface having the crosscut and peeled off. The state of the surface is evaluated by visual observation.

Erichsen: mm

Impact strength: Du Pont-type, ½ inch, 500 g.cm

Flexural strength: 2 mm $\phi$

Chemical resistance: Tested by immersing the sample for 24 hours in a 5% NaOH aqueous solution or a 5% $H_2SO_4$ aqueous solution, or for 2 hours in gasoline ("Nisseki Gold").

Thinner rubbing: The sample is rubbed 100 times with a lacquer thinner (composed of toluene/butyl acetate/methyl isobutyl ketone/butanol=50/25/20/5 by weight).

TABLE 7

| | Example | | | | | Comparative Example | | | |
|---|---|---|---|---|---|---|---|---|---|
| | 5 | 6 | 7 | 8 | 9 | 6 | 7 | 8 | 9 |
| Polyisocyanate | P1 | P2 | P3 | P4 | P5 | T1 | T2 | "Burnock DN-950" | Commercial biuret-type curing agent |
| Drying property (dust-free time) | | | | | | | | | |
| Clear varnish (minutes) | 65 | 20 | 35 | 35 | 35 | (*1) | 140 | 120 | 110 |
| White enamel (minutes) | 35 | 15 | 25 | 25 | 25 | | 80 | 65 | 65 |
| Properties of the air-dried coated film (left to stand at 20° C. for 7 days after coating) | | | | | | | | | |
| Gloss | | | 92 | | | (*1) | 92 | 93 | 92 |
| Hardness | | | F-H | | | | | | F |
| Adhesion | 100/100 | 85/100 | 100/100 | 100/100 | 100/100 | | | | 100/100 |
| Erichsen | >7 | 1.5 | >7 | >7 | >7 | | | | >7 |
| Impact strength | 40 | 20 | 30 | 30 | 30 | | | | >50 |
| Flexural strength | ⊚ | x | ⊚ | ⊚ | ⊚ | | | | ⊚ |
| Acid resistance | | | ⊚ | | | | | | ⊚ |
| Alkali resistance | | | ⊚ | | | | | | ⊚ |
| Gasoline resistance | | | ⊚ | | | | | | ⊚ |
| Thinner rubbing | ⊚ | ⊚-○ | ⊚ | ⊚ | ⊚ | | | | ⊚ |
| Properties of the forcibly dried coated film (dried at 80° C. for 30 minutes and left to stand for 7 days) | | | | | | | | | |
| Gloss | 93 | 92 | 92 | 93 | 92 | (*1) | | 92 | |
| Hardness | | | F-H | | | | F-H | F | F |
| Adhesion | 100/100 | 85/100 | 100/100 | 100/100 | 100/100 | | | 100/100 | |
| Erichsen | >7 | 1 | >7 | >7 | >7 | | | >7 | |
| Impact strength | 30 | 10-20 | 30 | 30 | 30 | | 30 | 40 | 30 |
| Flexural strength | ⊚ | x | ⊚ | ⊚ | ⊚ | | | ⊚ | |
| Acid resistance | | | ⊚ | | | | | ⊚ | |
| Alkali resistance | | | ⊚ | | | | | ⊚ | |
| Gasoline resistance | | | ⊚ | | | | | ⊚ | |
| Thinner rubbing | ⊚ | ⊚-○ | ⊚ | ⊚ | ⊚ | | | ⊚ | |

(*1): Test impossible because of poor compatibility with "Acrydic A-800".

EXAMPLE 10

The polyisocyanates P1 to P5 and the comparative polyisocyanates (T2, "Burnock DN-950" and a commercial biuret-type curing agent) were tested for drying property in the form of clear varnishes prepared by using an acrylic polyol having a number average molecular weight of 18,000 and a hydroxyl value of 35 (NV=50.2%, viscosity X-Y, acid value 3.0; using a mixed diluent composed of toluene, xylene and butyl acetate) obtained by radical polymerization in a customary manner of styrene and methyl methacrylate as hard monomers and butyl acrylate and betahydroxyethyl methacrylate as soft monomers. The results are shown in Table 8.

TABLE 8

| | Polyisocyanate | | | | | Comparative polyisocyanate | | |
|---|---|---|---|---|---|---|---|---|
| | P1 | P2 | P3 | P4 | P5 | T2 | Burnoc DN-950 | Commercial biuret-type curing agent |
| Drying property (minutes) | 50 | 15 | 25 | 25 | 25 | 120 | 100 | 90 |

The foregoing Examples demonstrate that the composition of this invention has excellent weatherability and much improved drying property while conventional resin compositions for urethane paints have inferior drying property even when having good weatherability; and that the composition of this invention is non-yellowing and has excellent compatibility.

What is claimed is:

1. A process for producing a polyisocyanate containing an isocyanurate ring which comprises reacting at least one diisocyanate compound selected from the group consisting of alkylene diisocyanates, cycloalkylene diisocyanates and aralkylene diisocyanates with a cycloalkylene diol in the presence of an isocyanurating catalyst.

2. A resin composition for non-yellowing fast-drying urethane paints, said composition comprising as essential ingredients
   (A) a polyisocyanate containing an isocyanurate ring obtained by reacting at least one diisocyanate compound selected from the group consisting of alkylene diisocyanates, cycloalkylene diisocyanates and aralkylene diisocyanates with a cycloalkylene diol in the presence of an isocyanurating catalyst, and
   (B) an acrylic polyol having a number average molecular weight of 2,000 to 30,000 and a hydroxyl value of 20 to 200.

3. The process of claim 1 wherein the diisocyanate compound is a mixture of an alkylene diisocyanate and a cycloalkylene diisocyanate in a weight ratio of 85-55:-15-45.

4. The composition of claim 2 wherein the diisocyanate compound is a mixture of an alkylene diisocyanate and a cycloalkylene diisocyanate in a weight ratio of 85-55:15-45.

5. The process of claim 1 wherein the diisocyanate compound is a mixture of an alkylene diisocynate and an aralkylene diisocyanate in a weight ratio 95-70:5-30.

6. The resin composition of claim 2 wherein the diisocyanate compound is a mixture of an alkylene diisocyanate and an aralkylene diisocyanate in a weight ratio of 95-70:5-30.

7. The process of claim 1 wherein the cycloalkylene diol is a diol having 5 to 30 carbon atoms and containing a 5- to 7-membered rigid ring and is used singly or as a mixture of diols in an amount of about 0.3 to about 30 mole % based on the total amount of the diisocyanate compounds.

8. The process of claim 1 wherein aralkylene diisocyanate is present in an amount of not more than 50 mole % based on the total amount of alkylene diisocyanate and/or cycloalkylene diisocyanate.

9. The resin composition of claim 2 wherein the diisocyanate compound contains not more than 50 mole % of aralkylene diisocyanate based on the total amount of alkylene diisocyanate and/or cycloalkylene diisocyanate.

10. The process of claim: 1 wherein the isocyanurating catalyst is a compound having a low electron density and containing a strongly cationic atom or atomic grouping and is selected from the group consisting of compounds of the general formulae

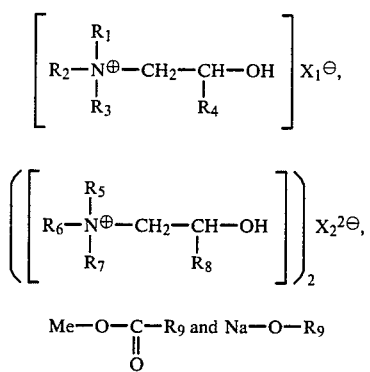

wherein $R_1$, $R_2$, $R_3$, $R_5$, $R_6$ and $R_7$ are identical or different and each represents a $C_1$-$C_{20}$ hydrocarbon group or $C_1$-$C_{20}$ hydrocarbon group containing a hetero atom such as nitrogen, oxygen or sulfur; $R_4$ and $R_8$ represent a hydrogen atom, a $C_1$-$C_{20}$ hydrocarbon group or a hydroxyl group containing $C_1$-$C_{20}$ hydrocarbon group; $X_1^{\ominus}$ represents a hydroxyl group, a monocarboxylate anion or a monophenolate anion having a $C_1$-$C_{20}$ hydrocarbon chain; $X_2^{2\ominus}$ represents a dicarboxylate anion or a diphenolate anion having a $C_1$-$C_{20}$ hydrocarbon chain; $R_9$ represents a $C_1$-$C_{15}$ hydrocarbon group or a $C_1$-$C_{15}$ hydrocarbon group containing a hetero atom and $M_c$ represents sodium or potassium.

11. The process of claim 1 wherein the isocyanurating catalyst is used in an amount of 0.001 to 0.2% by weight based on the total amount of the diisocyanate compound and the diol charged.

12. The process of claim 1 wherein the isocyanurating reaction is carried out at a temperature in the range of about 30° to about 120° C.

13. The process of claim 1 wherein the amount of the polyisocyanate formed is within the range of 20 to 70% by weight based on the total amount of the starting material.

14. The composition of claim 2 wherein the polyisocyanate (A) containing an isocyanurate ring has a molecular weight of 500 to 2,000.

15. The composition of claim 2 wherein the acrylic polyols have a glass transition point (Tg) of from 25° to 80° C.

16. The resin composition of claim 2 wherein the polyisocyanate component (A) and the acrylic polyol component (B) are blended in proportions to provide an equivalent ratio of isocyanate groups and hydroxyl groups, NCO/OH, of 0.3 to 2.0.

17. The resin composition of claim 2 wherein the acrylic polyol is obtained by radical polymerization of at least one ethylenic hydrocarbon selected from the group consisting of styrene, alpha-methyl styrene, p-methyl styrene, p-methoxy styrene, p-tertbutylstyrene, methyl methacrylate, n-butyl methacrylate, isobutyl methacrylate, t-butyl methacrylate, 2-ethylhexyl methacrylate, ethyl acrylate, n-butyl acrylate, 2-ethylhexyl acrylate, 2-ethoxyethyl acrylate, beta-hydroxyethyl methacrylate, beta-hydroxypropyl methacrylate, beta-hydroxyethyl acrylate, diethyl fumarate, di-n-butyl fumarate, diisobutyl fumarate and di-2-ethylhexyl fumarate.

* * * * *